(12) United States Patent
Zhang et al.

(10) Patent No.: US 11,457,481 B2
(45) Date of Patent: Sep. 27, 2022

(54) RANDOM ACCESS RESOURCE ALLOCATION FOR INTEGRATED ACCESS AND BACKHAUL NODES

(71) Applicant: ZTE CORPORATION, Guangdong (CN)

(72) Inventors: Junfeng Zhang, Shenzhen (CN); Feng Bi, Shenzhen (CN); Peng Hao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/108,974

(22) Filed: Dec. 1, 2020

(65) Prior Publication Data

US 2021/0084693 A1 Mar. 18, 2021

Related U.S. Application Data

(63) Continuation of application No. PCT/CN2018/095064, filed on Jul. 10, 2018.

(51) Int. Cl.
*H04L 12/28* (2006.01)
*H04W 74/08* (2009.01)
(Continued)

(52) U.S. Cl.
CPC ..... *H04W 74/0833* (2013.01); *H04L 27/2605* (2013.01); *H04L 41/0803* (2013.01); *H04W 72/044* (2013.01)

(58) Field of Classification Search
None
See application file for complete search history.

(56) References Cited

U.S. PATENT DOCUMENTS 10,206,232 B2 * 2/2019 Novlan ............ H04W 74/0833
11,184,869 B2 * 11/2021 Abedini ............ H04W 56/0015
(Continued)

FOREIGN PATENT DOCUMENTS

KR 10-2010-0089262 A 8/2010
RU 2635550 C1 11/2017
(Continued)

OTHER PUBLICATIONS

AT&T: "NR initial Access Procedure Design" 3GPP TSG RAN1 Meeting #87; R1-1612361; Nov. 16, 2018; Reno, USA (6 pages).
(Continued)

*Primary Examiner* — Gerald A Smarth
(74) *Attorney, Agent, or Firm* — Foley & Lardner LLP

(57) ABSTRACT

A wireless communication method includes configuring, by a first communication node, a first set of parameters related to random access procedure by a second communication node on a first communication link between the first communication node and the second communication node, and receiving, from the second communication node, a random access signal that uses the first set of parameters on the first communication link. The first communication node also provides wireless connectivity to a third communication node via a second communication link that shares at least some transmission resources with the first communication link. The first set of parameters includes one or more of a random access format, a random access sequence index set, a random access sequence root sequence index, a random access cyclic shift, and random access time-frequency resources.

16 Claims, 3 Drawing Sheets

(51) Int. Cl.
    *H04L 27/26*     (2006.01)
    *H04L 41/0803*     (2022.01)
    *H04W 72/04*     (2009.01)

(56) References Cited

U.S. PATENT DOCUMENTS

| | | |
|---|---|---|
| 2010/0195607 A1 | 8/2010 | Lee et al. |
| 2011/0103296 A1* | 5/2011 | Ji ................ H04L 5/0007 370/315 |
| 2017/0005913 A1 | 1/2017 | Hampel et al. |
| 2017/0006499 A1 | 1/2017 | Hampel et al. |
| 2017/0094686 A1* | 3/2017 | Ramamurthi ....... H04L 27/2633 |
| 2018/0220466 A1* | 8/2018 | Park .................. H04W 72/0446 |
| 2019/0021084 A1* | 1/2019 | Stirling-Gallacher ................ H04W 72/048 |

FOREIGN PATENT DOCUMENTS

| | | |
|---|---|---|
| WO | WO-2012/020503 A1 | 2/2012 |
| WO | WO-2014/087556 A1 | 6/2014 |

OTHER PUBLICATIONS

Extended European Search Report for EP Appl. No. 18925774.4, dated Jun. 22, 2021 (16 pages).
First Office Action for RU Appl. No. 2020143760, dated Jun. 29, 2021 (with English translation, 26 pages).
AT&T: "Overview of physical layer enhancements for IAB" 3GPP TSG RAN WGJ Meeting #92bis R1-1804662, Apr. 20, 2018 (Apr. 202018), Sanya, China (7 pages).
AT&T: "Overview of physical layer enhancements for IAB" 3GPP TSG RAN WGJ Meeting #93 R1-1806970, May 25, 2018 (May 25, 2018), Busan, Korea (10 pages).
International Search Report and Written Opinion for PCT Appl. No. PCT/CN2018/095064 dated Mar. 27, 2019 (6 pages).
ZTE: "Overview of physical layer enhancements for IAB" 3GPP TSG RAN WG1 Meeting #93 R1-1806024, May 25, 2018 (May 25, 2018), Busan, Korean (9 pages).
First Office Action for JP Appl. No. 2020-563908, dated Jan. 6, 2022 (with English translation, 9 pages).
First Office Action for KR Appl. No. 10-2020-7037672, dated Jan. 26, 2022.
Qualcomm Inc., "Enhancements to support NR backhaul links" 3GP TSG RAN WG1 Meeting #93, R1-1807393, May 25, 2018, Busan, Korea (14 pages).

* cited by examiner

Format B4

Format C2

Format A1

RANDOM ACCESS RESOURCE ALLOCATION FOR INTEGRATED ACCESS AND BACKHAUL NODES

CROSS-REFERENCE TO RELATED APPLICATION

This application claims the benefit of priority under 35 U.S.C. § 120 as a continuation of PCT Patent Application No. PCT/CN2018/095064, filed on Jul. 10, 2018, the disclosure of which is incorporated herein by reference in its entirety.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document describes technologies that can be used by network devices to allocate random access resources to a class of wireless devices such as the integrated access and backhaul (IAB) node.

In one example aspect, a method of wireless communication is disclosed. The method includes configuring, by a first communication node, a first set of parameters related to random access procedure by a second communication node on a first communication link between the first communication node and the second communication node, and receiving, from the second communication node, a random access signal that uses the first set of parameters on the first communication link. The first communication node also provides wireless connectivity to a third communication node via a second communication link that shares at least some transmission resources with the first communication link. The first set of parameters includes one or more of a random access format, a random access sequence index set, a random access sequence root sequence index, a random access cyclic shift, and random access time-frequency resources.

In another example aspect, another method of wireless communication is disclosed. The method includes, receiving, from a first communication node, a first set of parameters related to random access procedure by a second communication node on a first communication link between the first communication node and the second communication node, and transmitting, from the second communication node, a random access signal that uses the first set of parameters on the first communication link, wherein the first communication node also provides wireless connectivity to a third communication node via a second communication link that shares at least some transmission resources with the first communication link, wherein the first set of parameters includes one or more of a random access format, a random access sequence index set, a random access sequence root sequence index, a random access cyclic shift, and random access time-frequency resources.

In yet another example aspect, a wireless communications apparatus comprising a processor is disclosed. The processor is configured to implement methods described herein.

In another example aspect, the various techniques described herein may be embodied as processor-executable code and stored on a computer-readable program medium.

The details of one or more implementations are set forth in the accompanying drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

The present document relates to the field of wireless communications and, in particular, to a method and an apparatus for allocating random access resources of an IAB node in a mobile communication system.

Section headings are used in this document to facilitate readability and do not limit the embodiments and techniques described in each section to that section only. Accordingly, embodiments may use together with each other techniques described in different sections.

To make the objectives, technical solutions, and advantages of the present invention clearer, the following describes the embodiments of the present invention in detail with reference to the accompanying drawings. It should be noted that, in the case of no conflict, the embodiments in the present application and the features in the embodiments can be combined with each other arbitrarily.

BRIEF DESCUSSION

The new generation of mobile communication system NR (new radio) allows more flexible network networking modes than the 2G, 3G, and 4G systems and the existence of new types of network nodes. Currently integrated IBA Nodes (Integrated Access and Backhaul Node) integrating a backhaul link and a normal NR access link can provide more flexible coverage and networking than a single cellular coverage. The method will be an important part of the future mobile communications network.

Figure 1:
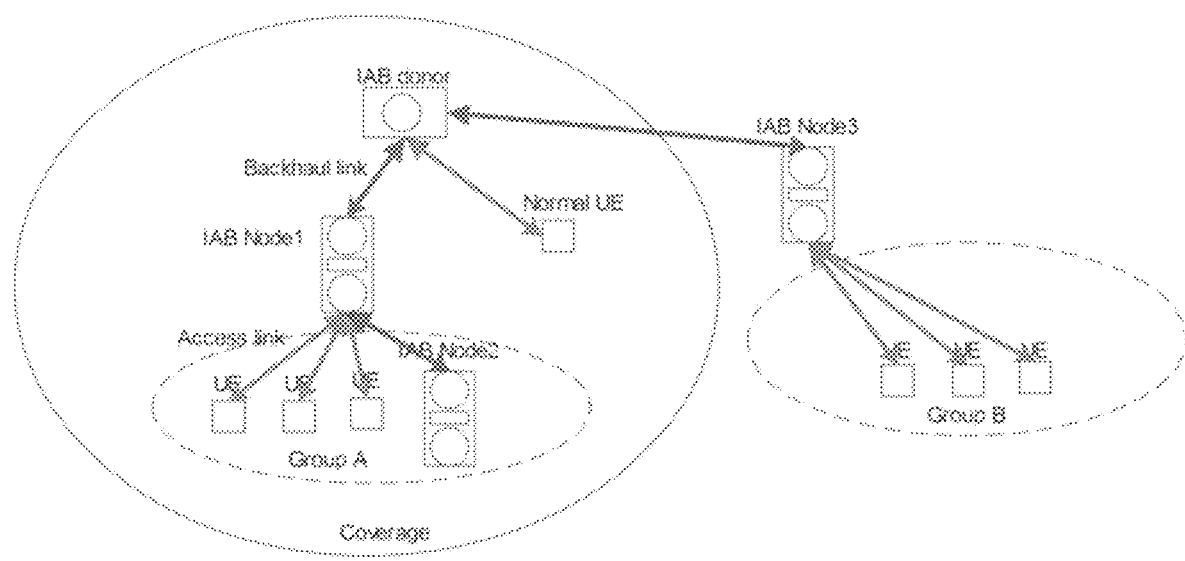
FIG. 1 shows an example of a wireless system in which IAB nodes are deployed.

For a new generation of mobile communication systems using IAB nodes, IAB nodes can be regarded as ordinary terminals as well as base stations accessed by other terminals, as shown in FIG. 1: IAB Node and IAB Donor for communication, the communication link is a backhaul link. In this case, the IAB Node1 can be regarded as an ordinary terminal; but the IAB Node1 can also communicate with other common terminal UEs in group A (Group A) and other IAB Node2, and the communication link is an access link from IAB Node1 aspect. This time, this IAB Node1 can be regarded as a special kind of base station. It becomes the relay between other ordinary terminals and other IAB Nodes with IAB donors. The special part lies in the fact that the IAB Node is a special type of integration of base station and terminal. Its deployment location is very different from that of ordinary terminals. For example, IAB Nodes are often fixed below the eaves, and they are much higher than ordinary terminals, this is easy for IAB Donor establishing a direct radio path to IAB Nodes; for example, the IAB Node often has more antennas ports than the normal terminal; also, for example, the IAB Node may need to be placed farther away from the IAB donor than the normal terminal (such as the IAB Node3 in the FIG. 1) coverage of ordinary terminals, etc. These different points put different demands on the transmission of random access between the IAB Node and the IAB donor. It is necessary to consider the arrangement and configuration of the IAB Node's random access resources and formats in a targeted manner.

EXAMPLES OF BASE STATION SIDE TECHNIQUES

Example A1. The IAB anchor or IAB parent node configures a random access parameter for the IAB node. After the configuration, the IAB anchor or IAB parent node receives the random access signal sent by the IAB node on the backhaul link. The random access parameters include one or any combination of a random access format, a random access sequence index set, a random access sequence root sequence index, a random access cyclic shift, and random access time-frequency resources.

Example A2. The operation in Example A1, wherein the random access format of the random access parameters configured for the IAB node is independently configured from the random access format for the non-IAB node. For example, the independent configuration may mean that any random access parameter is possible for a given random access format. In other words, given value of one of the random access format or random access parameter, the value of the other may be indeterminable.

Example A3. The operation of Example A1, wherein the random access sequence index set in the random access parameter configured for the IAB node and the random access index set for non-IAB nodes are configured by an independent configuration.

Example A4. The operation of Example A1, wherein: the random access root sequence index in the random access parameter for the IAB node and the random access root sequence index for non-IAB nodes are configured by an independent configuration. Furthermore, the random access cyclic shift for the IAB node and the random access cyclic shift for non-IAB nodes are configured by an independent configuration.

Example A5. The operation of Example A1, wherein: the random access time-frequency domain resources for IAB node and random access time-frequency domain resources for non-IAB nodes are independently configured. For example, the two types of random access time-frequency resources may not overlap or overlap partially.

EXAMPLES OF TERMINAL SIDE TECHNIQUES

Example B1

A method for allocating random access resources in which IAB node receives IAB node random access parameters. Based on the received IAB node random access parameters, the IAB node sends a random access sequence for a backhaul link according to the IAB node random access parameter. The IAB node may also receive a random access signal for an access link sent by an IAB terminal. The random access parameters include random access format, random access sequence index set, random access sequence root sequence index, random access cyclic shift, one or any combination of random access time-frequency resources.

Example B2

The operation of Example B1, wherein the random access format of the IAB node random access parameter and the random access format of a non-IAB node are independently configured. For example, the independent configuration may mean that any random access parameter is possible for a given random access format. In other words, given value of one of the random access format or random access parameter, the value of the other may be indeterminable.

Example B3

The operation of Example B1, wherein the random access sequence index set in the IAB node random access parameter is independently configured from the random access index set of non-IAB nodes.

Example B4

The operation of Example B1, wherein: the random access root sequence index and cyclic shift in the IAB node random access parameter, and the random access root sequence index and cyclic shift in the non-IAB node random access parameter are independently configured.

Example B5

The operation of Example B1, characterized in that the random access time-frequency resources in the IAB node random access parameters and the random access time-frequency resources in the non-IAB node random access parameters are independently configured. The two types of random access time-frequency resources may not overlap or overlap partially.

Example B6

The operation of Example B1, wherein: the IAB node configures the random access parameter of the random access signal for the access link to the IAB terminal.

Example B7

The operation of Example B6, wherein the parameters of the random access configured by the IAB node to the IAB terminal are reported by the IAB node to the IAB donor or the IAB parent node.

EXAMPLE EMBODIMENTS

When the IAB node is deployed in the next generation of mobile communication network, the IAB node deployment location and the multi-antenna characteristic of the IAB node itself cause the random access format selection of the IAB node to be different from that of an ordinary terminal such as user equipment (UE). The random access format selection needs to match the coverage of different distances, different RF transmission environments, and the additional path loss values that need to be compensated. The IAB nodes generally have higher heights, and often have more direct radio paths with other network nodes such as a base station. This is in contrast to the lower height of ordinary terminals, which leads to significantly different propagation environments in urban areas where the radio path is mostly indirect. For example, most user devices may be operated within 6 feet of ground, where many other interfering objects such as cars, buildings and trees are found. On the other hand, IAB devices may often be deployed near roof tops, and may be operating at heights of 20 to 30 feet or above, thus avoiding many interferers or reflectors experienced by user devices.

In general, because an ordinary terminal is mainly in an indirect path scenario, the path loss value that needs to be compensated is also relatively high. This scenario may force the wireless system to use the random access format B4 or longer format. The random access format B4 has a large number of short sequences (12, to be precise). More short sequences are accumulated to achieve energy gain to compensate for higher path loss. However, since the guard time of the prefix and suffix of the B4 format is shorter than that of the random access format C2, under the scenario that the coverage distance is determined only by the round-trip time of the electromagnetic signal between the base station and the terminal, the effective coverage of a B4 transmission extends over an area that is less than that of C2. That is to say, the format C2 is suitable for the scenario that the coverage is wider than the normal terminal and is based on the direct radio path.

In addition, typically, an IAB node has more antennas than a typical UE. Therefore, path loss is not the main transmission obstacle that the IAB node needs to overcome when sending a random access signal. The random access format C2 has a long enough prefix and guard time suffix to resist large time delays due to propagation delay. Therefore, IAB nodes may prefer to use C2 format random access signals over another format such as the B4 random access format.

Figure 2:
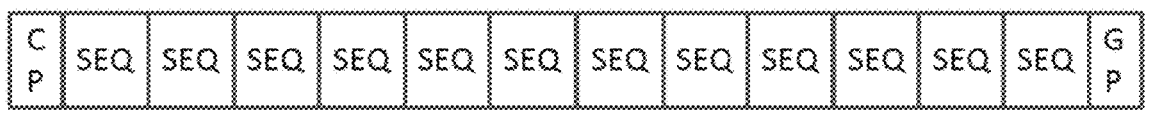
FIG. 2 shows an example of physical random access channel (PRACH) formats using B4, A1 and C2 random access formats.
Figure 2:
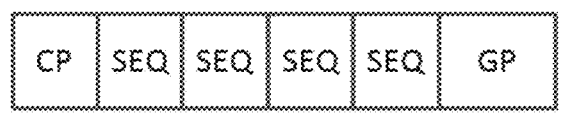
Figure 2:
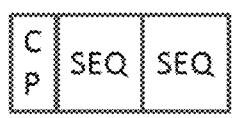

FIG. 2 shows the random access format B4, A1 and C2 signal structure.

Table 1 shows examples of parameters of random access formats B4, C2, and A1. The column headers use the following abbreviations: CP For the cyclic prefix, GP is the guard time, Ts is the sampling point.

TABLE 1

| Random Access Format | Sequence number | CP length (Ts) | Total sequence length (Ts) | GP length (Ts) |
| --- | --- | --- | --- | --- |
| B4 | 12 | 936 | 24576 | 792 |
| C2 | 4 | 2048 | 8192 | 2912 |
| A1 | 2 | 288 | 4096 | 0 |

However, in the existing draft standards of new generation communication systems, only one random access signal format is allowed to be allocated in the same BWP (bandwidth part), and it is not allowed to simultaneously configure the formats B4 and C2. Because if the formats B4 and C2 are configured at the same time, since the prefix lengths of the two formats are different, the relative starting points of the effective short sequence symbols are different, which may cause ambiguity in the timing determination. In addition, because the number of short sequence symbols supported by the two formats is different, random access preamble signals cannot be blindly detected in a longer format, which may cause access failure. Therefore, when two or more random access signal formats are possible for a same bandwidth part (BWP), the type of the random access signal format actually being used by a transmission can be effectively distinguished at the base station side using techniques described herein. The following four examples illustrate the related solutions.

Embodiment Example 1

Resource Allocation Scheme for Random Access Signals of IAB Nodes in Normal Coverage As shown in FIG. 1, the IAB Node1 is within the normal coverage of the IAB donor. The normal coverage refers to the maximum coverage that an ordinary terminal that is not an IAB node can support. In the normal coverage, code division, specifically, the specific index of the IAB node within the range of the random access preamble index can be used to distinguish from the normal terminal. In general, BWP in the next-generation mobile communication system supports the terminal to randomly select among 64 random access preambles. In addition to this, some embodiments may follow a rule that some of the 64 random preamble indexes are dedicated to the IAB node, and the base station can identify whether a received random access preamble sequence was sent by the IAB node or by the non-IAB node by identifying the index of the received random access preamble from all possible preambles (e.g., 64 preambles), and then checking whether the index was from dedicated portion or from the non-dedicated portion of the random access indexes.

Embodiment Example 2

Resource Allocation Scheme for Random Access Signals of IAB Nodes Outside Normal Coverage As shown in FIG. 1, the IAB Node3 is outside the normal coverage of the IAB donor. Here, the "normal" coverage may refer to a nominal range of coverage for which the corresponding base station that is the IAB donor. Due to the difference in coverage with ordinary terminals, e.g., different physical layer characteristics of the wireless channel between the IAB donor and the IAB node, in some embodiments, the IAB nodes may use different random access preamble formats to meet the need for enhanced coverage, such as using the format C2 that is specifically used for coverage enhancement.

The set of random access preamble sequences for the next generation mobile communication system may be obtained by cyclically shifting a root sequence multiple times. If all cyclic shifts under the same root sequence do not satisfy the 64 indexes in BWP, embodiments should use more root sequences to generate more random access sequence indexes until a total of 64 indexes are generated. The size of the cyclic shift (Ncs) determines the number of sequences that can be generated under a single root sequence. The larger the Ncs is, the fewer the sequences that can be generated, and vice versa. Since the value of Ncs should meet the requirement of the zero correlation window, its value depends on the size of the coverage area of the cell. The larger the coverage area of the cell, the larger the value of Ncs should be, and the smaller the coverage area, smaller the value of Ncs is. Since the coverage of IAB Node3 is larger than that of normal terminals, the Ncs_IAB of IAB Node3 should be larger than the cyclic shift Ncs_UE of random access sequences of normal terminals or UEs.

In the case where Ncs is different, the IAB node's root sequence of the random access preamble sequence should not be the same as the random access root sequence of an ordinary terminal. Furthermore, its root sequence should be independent of the random access root sequence of an ordinary terminal. In addition to the normal terminal's random access root sequence and Ncs, the system also should configure an independent random access root sequence and Ncs_IAB for IAB nodes. The IAB-specific root sequence and Ncs_IAB determine the set of random access sequences available for IAB nodes.

Embodiment Example 3

Conflict Resolution of Random Access Signals Between an IAB Node and an Ordinary Terminal Compared with ordinary terminals (e.g., UEs), IAB nodes have a smaller density in the network deployments, and therefore require fewer random access resources. Thus, a random access time-frequency resource arrangement for IAB nodes could be sparser than for ordinary UEs. Even so, there is always a possibility of occurrence of collision of random access transmissions initiated between the two (IAB node and UE), and thus cannot fundamentally avoid the problem that the random access sequence transmitted by the ordinary terminal and the IAB node collides on the same time-frequency resource. Although from the perspective of the IAB donor node, when the random access sequences sent by the ordinary terminal and the IAB node collides on the same time-frequency resource, it may be possible to determine whether the detected random access sequence is an IAB-dedicated random access preamble sequence. The mapping relationship between the random access resource of the IAB node and the downlink signal and the mapping relationship between the normal terminal random access resource and the downlink signal are not the same, and when in the same time-frequency resource being used for signal transmission, if transmissions with two random access formats that collide with each other, the best receiving beam cannot simply be taken into consideration at the receiving side of the base station, which greatly increases the probability of detection failure.

Figure 3:
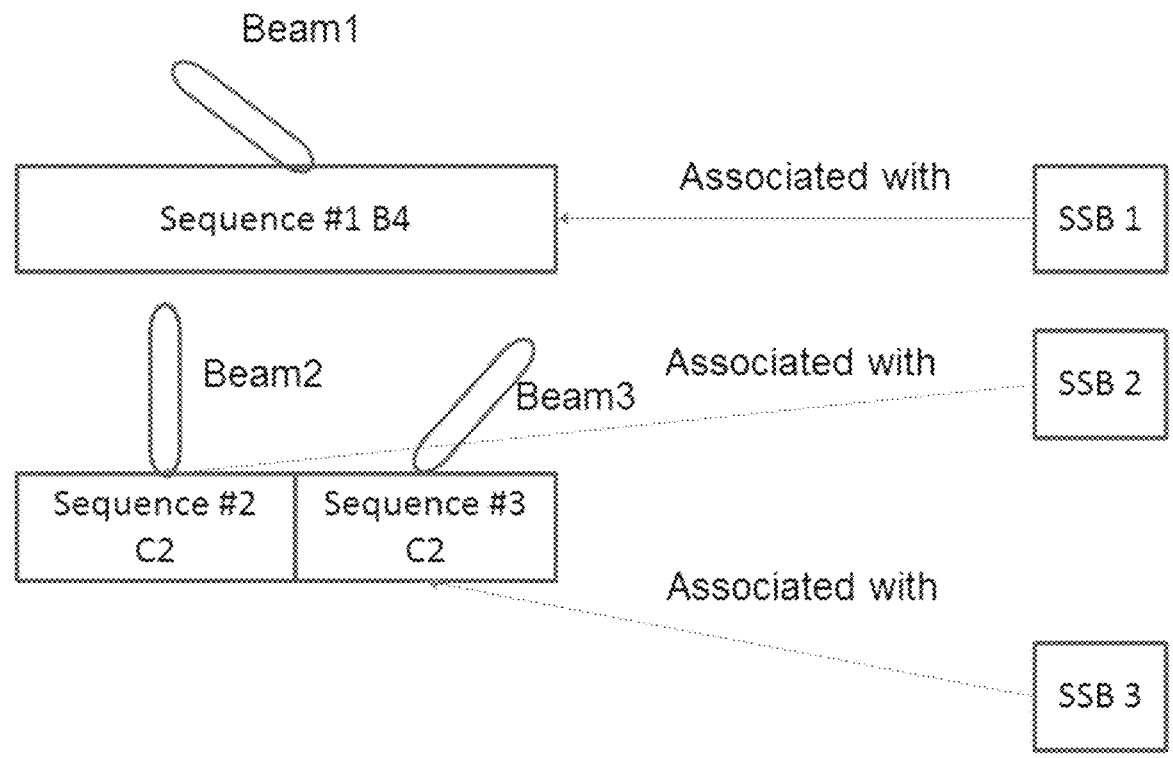
FIG. 3 shows an example implementation in which a collision of random access transmissions may occur.

FIG. 3 illustrates an example of collision between the receive beams of the IAB random access and random access of ordinary users. As shown in FIG. 3, the ordinary terminal uses the B4 format. There is only one random access sequence 1 that can fit within a time slot. In this case, the mapped downlink signal is a sync block 1 (SSB 1). In this configuration, an IAB node uses a C2 format. Since C2 is shorter than B4, it is possible to have two consecutive random access sequences 2 and 3 in the time slot, and the corresponding mapped sync blocks are 2 and 3. The base station may use either receive beam 1 corresponding to sync block 1 or receive beams 2 and 3 corresponding to sync blocks 2 and 3 at this random access opportunity (RO: RACH occasion). If the base station uses beam1, this is not the best beam for sequences 2 and 3, and if the base station uses beam2 and beam3, these are not the best beams for sequence 1. A single best beam cannot fit for all situations.

Therefore, one way to solve the conflict problem is still to configure the random access time-frequency resources of IAB nodes and the random access time-frequency resources of ordinary terminals independently, and to ensure that there is no overlap between them. The sub-optimal method is the independent configuration of both time-frequency resources, but allows a certain percentage of overlap. If it is indeed because of resource limitation, the random access time-frequency resources of the IAB node and the ordinary terminal cannot be configured independently, then it is beneficial to ensure that the downlink signals mapped by the corresponding random access occasions on the same time-frequency resource are consistent.

Still taking FIG. 3 as an example, an ordinary terminal uses the B4 format. There is only one random access sequence 1 in a time slot. The mapped downlink signal is a sync block 1, the IAB node uses a C2 format, and there are two random access sequence in one time slot. The successive random access sequences 2 and 3 must also have a mapped sync block of 1. This particular mapping relationship guarantees that it is not difficult to implement because the ratio of the number of available B4 and C2 in a time slot is determined, and the mapping relationship between the downlink signal and the random access occasion can be set according to this ratio. For example, if the mapping relationship between the downlink signal and the random access opportunity is set to 1:1 for the B4 format, the mapping relationship between the downlink signal and the random access opportunity configured in the C2 format is 1:2.

Embodiment Example 4

Conflict Resolution of Random Access Signals of IAB Nodes and IAB Terminals

The IAB node is a hybrid of a network node and a terminal. The node itself has an independent cell identifier (Cell ID) and independent radio resource management capability. The IAB node can configure random access parameters that are independent of ordinary terminals for IAB terminals within the coverage of the IAB node. Since the conventional coverage controlled by IAB nodes is much smaller than that of the ordinary anchor base station, and the multi-antenna capability of IAB is also different from that of anchor base stations, it is also useful to configure the IAB terminals within the coverage of IAB nodes to be independent of ordinary terminal's random access parameters. For example, the random access format A1 is configured for the IAB terminal that within the coverage of the IAB node, and the random access format of the terminal under the control of the anchor node or the IAB parent node base station is B4, and the total length of the random access format A1 sequence is shorter. This makes the format suitable for a cell with a very smaller coverage and also facilitates control of interference to random access signals sent by ordinary terminals. The IAB node should therefore configure the IAB terminal with a random access root sequence and Ncs independent of the normal terminal and the IAB node.

The parameters of the random access procedure, configured by the IAB node to the IAB terminal, may also be reported to the IAB donor or the IAB parent node. Reporting the corresponding random access resource parameter is beneficial to the IAB donor or the IAB parent node to properly configure the RACH resources of the IAB node and the IAB node to receive the downlink backhaul link resources according to the RACH resources of the IAB terminal so as to avoid the collision with RACH access link of the IAB terminal. Resolving resource conflicts on the access link is especially important when the IAB uses wavelength division multiplexing to isolate return links and access links.

Figure 4:
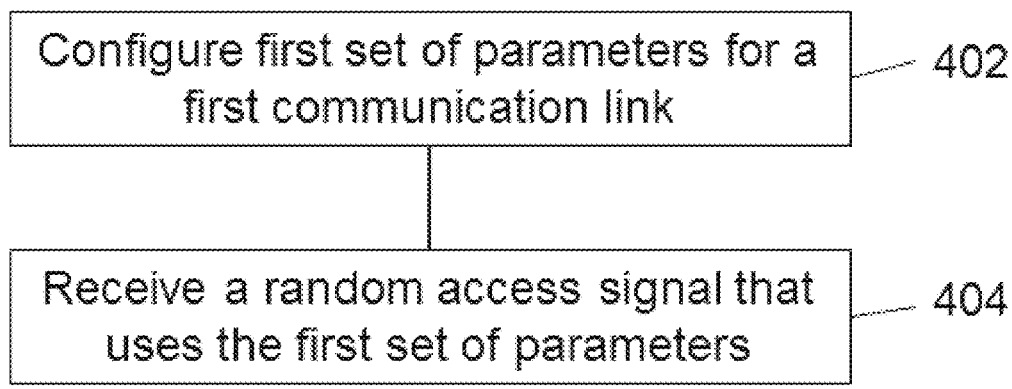
FIG. 4 is a flowchart of an example wireless communication method.

FIG. 4 is a flowchart depiction of a method 400 of wireless communication. The method 400 includes configuring (402), by a first communication node, a first set of parameters related to random access procedure by a second communication node on a first communication link between the first communication node and the second communication node, and receiving (404), from the second communication node, a random access signal that uses the first set of parameters on the first communication link. The first communication node also provides wireless connectivity to a third communication node via a second communication link that shares at least some transmission resources with the first communication link. The first set of parameters includes one or more of a random access format, a random access sequence index set, a random access sequence root sequence index, a random access cyclic shift, and random access time-frequency resources.

Figure 5:
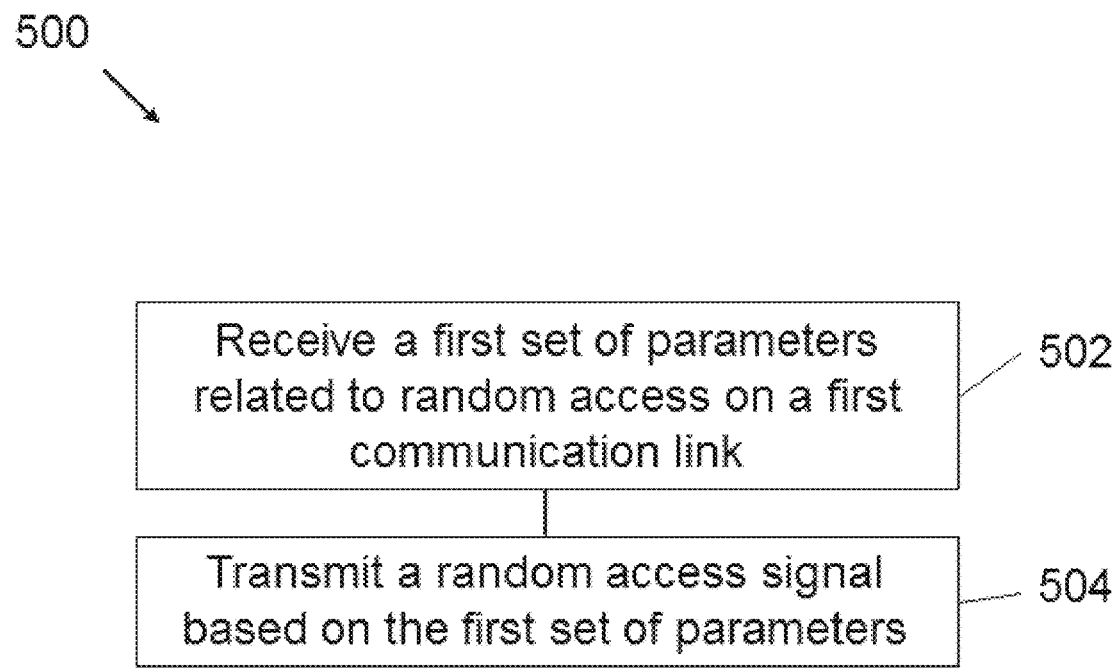
FIG. 5 is a flowchart of an example wireless communication method.

FIG. 5 is a flowchart depiction of an example method 500 of wireless communication. The method 500 includes, receiving (502), from a first communication node, a first set of parameters related to random access procedure by a second communication node on a first communication link between the first communication node and the second communication node, and transmitting (504), from the second communication node, a random access signal that uses the first set of parameters on the first communication link. The first communication node also provides wireless connectivity to a third communication node via a second communication link that shares at least some transmission resources with the first communication link. The first set of parameters includes one or more of a random access format, a random access sequence index set, a random access sequence root sequence index, a random access cyclic shift, and random access time-frequency resources.

With reference to methods 400 and 500, in some embodiments, the first communication node may be an IAB parent node (e.g., a base station or another network node). In such a case, the second communication node may be an IAB node and the first communication link may be a backhaul link. In some embodiments, the first communication node, e.g., the IAB parent node, may also be configured to provide wireless connectivity to a third communication node such as a user device or UE. In such a case, the communication link between the first and third communication nodes may be the wireless channel to/from the user device and from/to the base station.

With reference to methods 400 and 500, in some embodiments, the configuration of the random access format in the first set of parameters is not related to the random access format in the second set of parameters used by the third node for random access using the second communication link, and therefore these parameters may be independently assigned.

As described, several of the parameters associated with random access channel procedure may be used during methods 400 and 500. These parameters may include random access format, a random access sequence index set, a random access sequence root sequence index, a random access cyclic shift, and random access time-frequency resources. Furthermore, these parameters may be independently assigned on the first and second communication links. For example, these assignments may be based on the conditions of each communication link, and decision taken regarding which parameter to select for use on one link may not have any influence on the decision taken for the other link. In some embodiments, the second communication node (e.g, an IAB node) may provide wireless connectivity to another network node. This another network node may be an IAB node or may be a UE.

Figure 6:
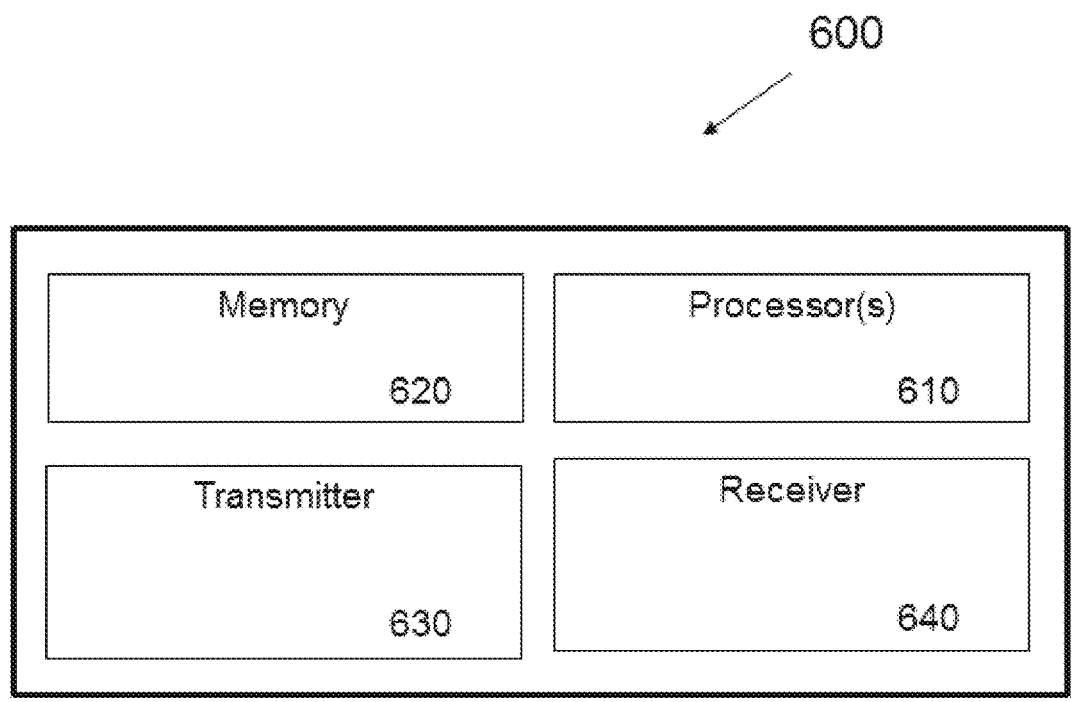
FIG. 6 is a block diagram example of a wireless communication apparatus.

FIG. 6 shows an example of a wireless communication apparatus 600. The apparatus 600 may implement the methods 400 or 500 or other techniques described in the present document. The apparatus 600 may be, for example, the first communication node, the second communication node, or the third communication node described herein. For example, the apparatus 600 may implement functionality of a base station (e.g., eNB or gNB). In some embodiments, the apparatus 600 may be used to implement a user device such as a smartphone, an IoT device, a laptop, a tablet, and so on.

The apparatus 600 includes one or more processor 610. The apparatus 600 may include one or more memories 620. The apparatus 600 may include one or more transmitters 630. The apparatus 600 may include one or more receivers 640. The processor 610 may be configured to execute code and implement a wireless communication method such as method 400 or method 500. The memory 620 may be used to store processor-executable code, data, results of intermediate calculations during the execution of wireless communication methods, and so on. The transmitter 630 may be configured to transmit, via a network interface, at least some of the various messages and signals described herein. The receiver 640 may be configured to receive, via a network interface, at least some of the signals and messages described herein. The apparatus 600 may use multiple transmitters and or receivers, for example, for performing communication on a cellular wireless and a backhaul connection.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method for wireless communications, comprising:
configuring, by a first communication node, a first set of parameters related to random access procedure, wherein the random access procedure is performed by a second communication node on a first communication link between the first communication node and the second communication node; and
receiving, from the second communication node, a random access signal that uses the first set of parameters on the first communication link;
wherein a second communication link between the first communication node and a third communication node shares at least some transmission resources with the first communication link;
wherein the first set of parameters include random access time-frequency resources; and
wherein time domain resources of transmission resources are independently configured for the second communication node and the third communication node.

2. The method of claim 1, wherein the first set of parameters further include: a random access format, a random access sequence root sequence index, and a random access cyclic shift.

3. The method of claim 1, wherein the transmission resources configured for the second communication node and the transmission resources configured for the third communication node partially overlap with each other.

4. The method of claim 1, wherein an arrangement of time domain resources of the transmission resources configured for the third communication node is sparser than an arrangement of time domain resources of the transmission resources configured for the second communication node.

5. A method for wireless communications, comprising:
receiving, by a second communication node from a first communication node, a first set of parameters related to random access procedure, wherein the random access procedure is performed by the second communication node on a first communication link between the first communication node and the second communication node; and
transmitting, by the second communication node, a random access signal that uses the first set of parameters on the first communication link;
wherein the first communication link shares at least some transmission resources with a second communication link between the first communication node and a third communication node; and
wherein the first set of parameters include random access time-frequency resources; and
wherein time domain resources of transmission resources are independently configured for the second communication node and the third communication node.

6. The method of claim 5, wherein the first set of parameters further include: a random access format, a random access sequence root sequence index, and a random access cyclic shift.

7. The method of claim 5, wherein the transmission resources configured for the second communication node and the transmission resources configured for the third communication node partially overlap with each other.

8. The method of claim 5, wherein an arrangement of time domain resources of the transmission resources configured for the third communication node is sparser than an arrangement of time domain resources of the transmission resources configured for the second communication node.

9. A wireless communications apparatus comprising a processor, wherein the processor is configured to:
configure a first set of parameters related to random access procedure, wherein the random access procedure is performed by a second communication node on a first communication link between a first communication node and the second communication node; and receive, from the second communication node, a random access signal that uses the first set of parameters on the first communication link;

wherein a second communication link between the first communication node and a third communication node shares at least some transmission resources with the first communication link;

wherein the first set of parameters include random access time-frequency resources; and wherein time domain resources of transmission resources are independently configured for the second communication node and the third communication node.

10. The apparatus of claim 9, wherein the first set of parameters further include: a random access format, a random access sequence root sequence index, and a random access cyclic shift.

11. The apparatus of claim 9, wherein the transmission resources configured for the second communication node and the transmission resources configured for the third communication node partially overlap with each other.

12. The apparatus of claim 9, wherein an arrangement of time domain resources of the transmission resources configured for the third communication node is sparser than an arrangement of time domain resources of the transmission resources configured for the second communication node.

13. A wireless communications apparatus comprising a processor, wherein the processor is configured to:

receive, from a first communication node, a first set of parameters related to random access procedure, wherein the random access procedure is performed by a second communication node on a first communication link between the first communication node and the second communication node; and transmit a random access signal that uses the first set of parameters on the first communication link;

wherein the first communication link shares at least some transmission resources with a second communication link between the first communication node and a third communication node; and wherein the first set of parameters include random access time-frequency resources; and wherein time domain resources of transmission resources are independently configured for the second communication node and the third communication node.

14. The apparatus of claim 13, wherein the first set of parameters further include: a random access format, a random access sequence root sequence index, and a random access cyclic shift.

15. The apparatus of claim 13, wherein the transmission resources configured for the second communication node and the transmission resources configured for the third communication node partially overlap with each other.

16. The apparatus of claim 13, wherein an arrangement of time domain resources of the transmission resources configured for the third communication node is sparser than an arrangement of time domain resources of the transmission resources configured for the second communication node.

* * * * *